Aug. 11, 1959  G. A. HEMPEL  2,898,971
ROLLER EXPANDING AND PEENING TOOL
Filed May 11, 1955  2 Sheets-Sheet 1
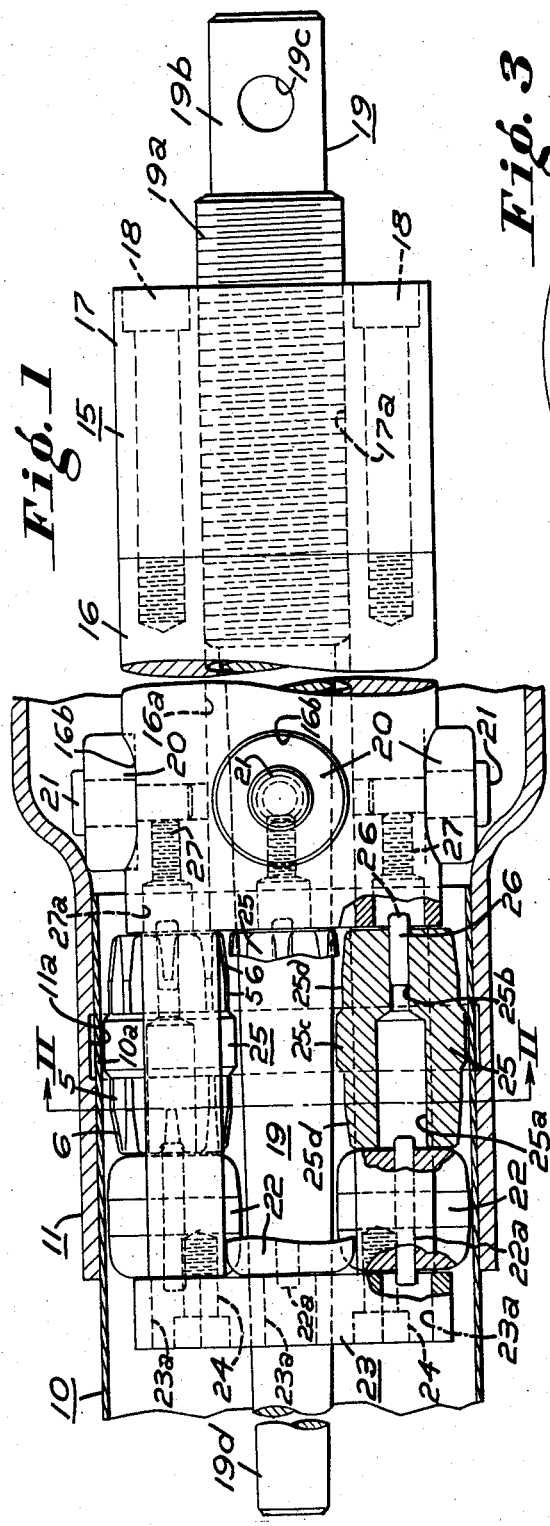
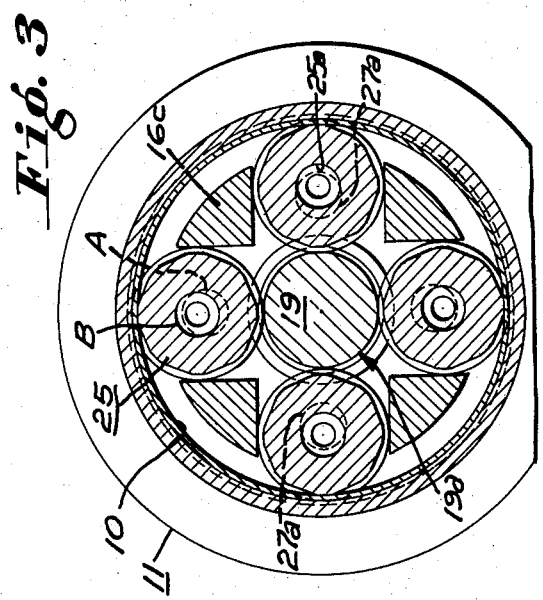
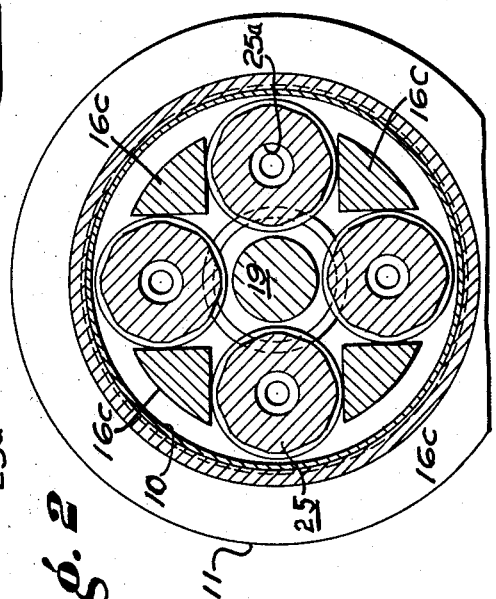
INVENTOR.
GUSTAV A. HEMPEL
BY
Green, McCallister & Miller
his Attorneys.

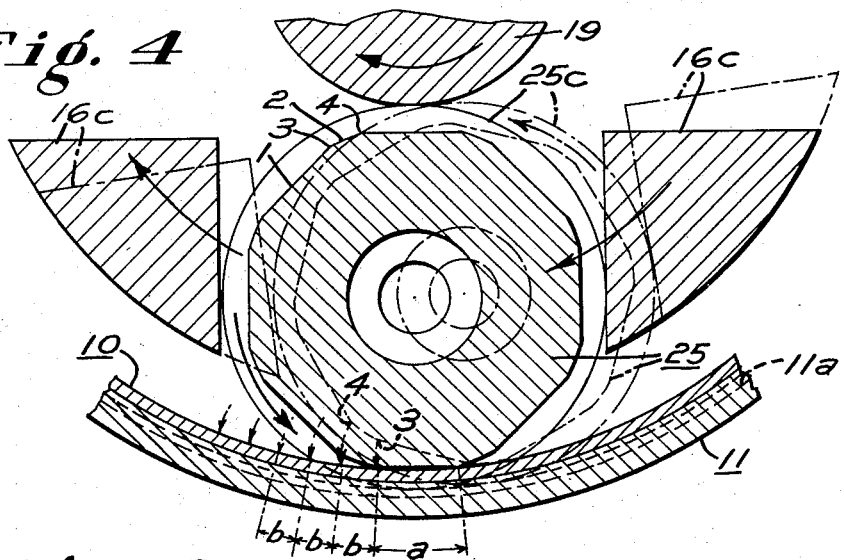
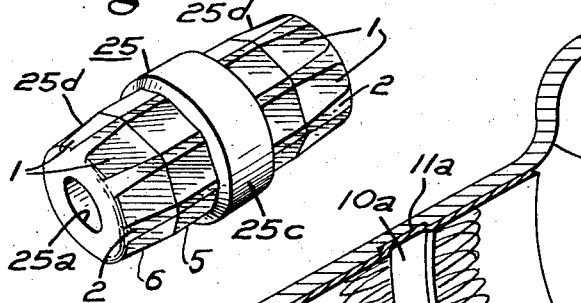
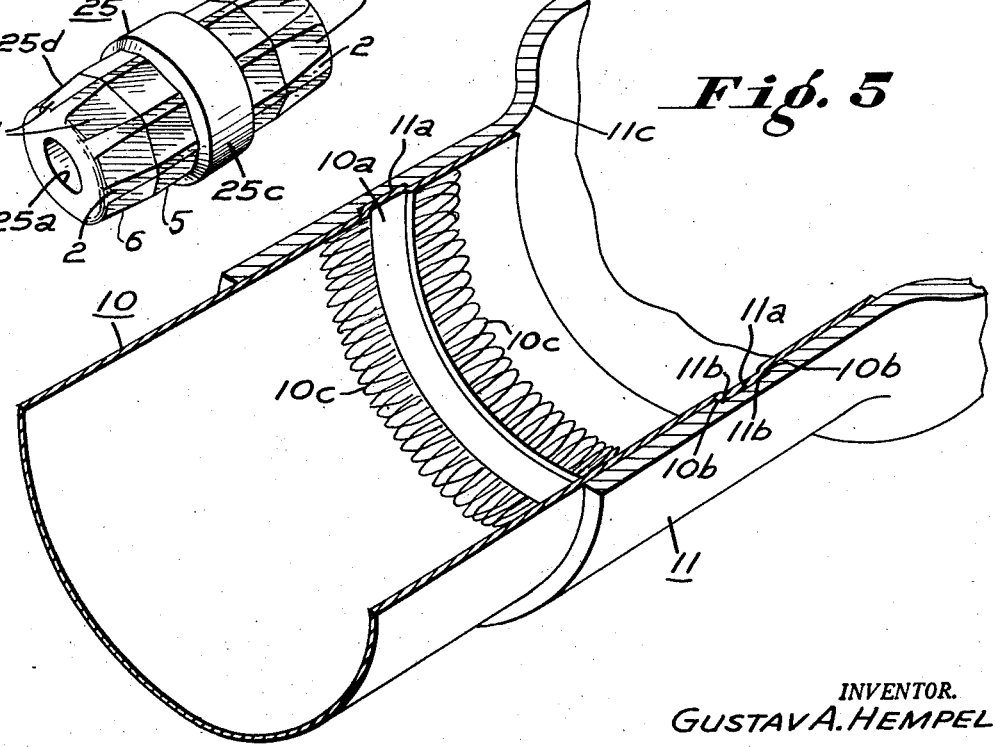

United States Patent Office 2,898,971
Patented Aug. 11, 1959

---

2,898,971

ROLLER EXPANDING AND PEENING TOOL

Gustav A. Hempel, Pittsburgh, Pa., assignor to McDowell Manufacturing Company, Pittsburgh, Pa., a corporation of Pennsylvania Application May 11, 1955, Serial No. 507,699

6 Claims. (Cl. 153—82)

---

This invention relates to the provision of an offset joint between a pair of cooperating members and particularly, to the forming an interlocking, annular, tongue and groove joint between a pair of interfitting or telescopic hollow or tubular members such as employed for carrying fluids.

An important phase of my invention relates to the joining of a relatively thin wall tubular member or pipe section to a relatively heavier wall coupling body member or section. A construction of this type has a highly practical utilization in the field of portable irrigation systems, where it is important to minimize weight and to proportion relative wall thicknesses and relative strengths of the parts in accordance with their specific requirements. The purpose is to make use of members of as light as possible construction which will, at the same time, withstand relatively high fluid pressures of up to about eight or nine hundred pounds per square inch.

In United States Letters Patent of Robert A. Wallace, No. 2,709,092 of May 24, 1955, a joint employing a rolled-in wall section and mastic material was disclosed, the joining operation being effected by an expander tool of a rolling-out type.

Since the development of the Wallace apparatus and construction, there has been a need for a better type of joining procedure and for a better and simplified type of joint. The type of joint disclosed by Wallace has had practical application, as utilized with a mastic and for relatively lower fluid pressures in the neighborhood of about 90 to 100 pounds per square inch. However, the need is for a still higher pressure capacity and for fluid sealing-off of a joint without the necessity of employing a mastic.

The present invention has been devised with the purpose in mind of providing a greatly improved joint which makes possible the total elimination of an interposed layer of mastic and which singularly, without an additional spaced-apart latching joint, will serve to provide a practical and effective joint between tubing, pipe or hollow members, where pressures in the neighborhood of about up to 900 pounds per square inch may be encountered. Surprising as it may seem, it provides a leak-proof joint without the necessity for any soft mastic or sealing material and the operation is more easily and more quickly accomplished.

It has thus been an object of my invention to devise a new and simplified approach to the problem of joining a pair of hollow or tubular members together and employing an expanding-out operation;

Another object has been to devise a new and improved annular tongue and groove joint construction between an assembly or pair of annular, tubular or cylindrical hollow wall sections or members;

A further object of my invention has been to devise a new and improved type of means for rolling or expanding an annular joint between a pair of tubing members;

These and other objects of my invention will appear to those skilled in the art from the illustrated embodiment taken in view of the description thereof.

In the drawings,

Figure 1 is a longitudinal or side view in elevation and partial section, illustrating a tool constructed in accordance with my invention, employing novel principles of my invention, and in a preliminary position within a pair of pipe or tubing members which are to be joined together;

Figures 2 and 3 are end sections taken along the line II—II of Figure 1; Figure 2 shows the preliminary position of Figure 1 for the parts and essentially, of roller means and a wedge or mandrel shaft; on the other hand, Figure 3 shows the parts in an expanded and operating relationship with respect to the wall of the tubing member which is being expanded;

Figure 4 is a greatly enlarged fragmental end section taken along the same position as Figures 2 and 3; it somewhat diagrammatically illustrates the novel peening or hammering action of roller means of my invention;

Figure 4A is a view in side perspective showing one of the roller elements of Figure 4; and Figure 5 is a perspective horizontal section taken through the tubing or pipe member assembly of Figure 1 and showing a completed interlocking groove construction which has been effected in accordance with my invention.

Although any suitable rolling-out or expanding type of tool capable of using rolling elements may employ the principles of my invention, I have, for the purpose of illustration, shown a suitable type of tool in Figures 1 to 3, inclusive.

Referring particularly to Figure 1 of the drawings, 10 represents a tubing, pipe, hollow member or section which is to be expanded and joined to a tubular body, section or hollow member 11. In the drawings, the member 10 is shown of relatively thinner wall construction and the member 11 of relatively thicker or heavier wall construction. The purpose of the joint is to eliminate the need for a welding operation, a flange construction, etc., and to provide a relatively simple interlocking type of joint which will reinforce rather than weaken an assembly. Thus, a relatively thin wall, longitudinally-extending member 10, for example of aluminum, may be used with a relatively heavier wall member 11, for example of aluminum alloy, steel, etc. The outer wall member 11 may serve as a coupling housing body or nose part and thus requires greater strength than the inner wall member 10.

As a preliminary step in attaining a joint in accordance with my invention, the wall member 11 is provided with a radially-offset annular groove 11a on or open to the side or periphery over or within which the wall member 10 is to fit or telescope. The wall member 10 is provided with an interfitting diameter closely approximating the interfitting diameter of the wall member 11, that is, the outer diameter of the member 10 will closely approximate, but may be slightly larger than the inner diameter of the member 11.

The end portion of the member 10 is then inserted within the member 11, past the groove 11a, and the assembly is ready for the joint-expanding operation. At this time, an expander tool 15 is inserted endwise into an operating relationship within the wall member assembly until expansion rollers 25 are positioned with their central or intermediate cylindrical or annular banding portions 25c in alignment with the groove 11a. Peening surfaces or faces of each roller 25 that are located on at least one and preferably on opposite end portions 25d are positioned along adjacent transverse sides of the groove 11a. A wedge shaft, operating mandrel or expansion pin member 19 is then advanced as, for example, to the position of Figure 3 of the drawings from the position of Figure 2 to move the rollers 25 radially-outwardly into an operating and expanding relationship. At this time, the whole tool assembly is rotated to produce results such as shown particularly in Figures 4 and 5 of the drawings.

Referring particularly to Figures 4 and 5, the end portions 25d of each expansion-banding, joint-forming or rolling-out roller 25 define a plurality of progressively advancing hammer or peening edges which operate on opposite sides of the banding portion 25c and of the groove 11a and wall portion 10a to simultaneously produce an expanding and a peening-out of spaced-apart side bands 10c (see Figure 5) along the band or offset 10a and upon the member 11 along opposite sides of the groove 11a. At the same time, the banding portion 25c of each joint-forming roller 25 offsets, expands or bands-out annular wall portion 10a into the groove 11a in such a manner as to provide a shear type of joint.

Referring particularly to Figure 5 of the drawings, the joint is provided by a cooperating abutting relationship between the base portion of the groove 11a and the base portion of the band 10a, as well as by an outer edge line engagement between opposed side portions 10b with opposed outer edge portions of corresponding side portions 11b of the groove. This constitutes a strong, shear type of joint that is quickly effected by an expanding-peening action and which is leak-proof due to peened-in band portions 10c along the sides or edges of the offset band 10a. The joint produced is tight and leak-proof and requires no mastic between opposed locking-joint surfaces. Portions of the member 10 which are expanded into the other member 11 are done so evenly and uniformly throughout its periphery or circumference.

As shown particularly in Figures 4 and 4A of the drawings, the peening portions 25d of each roller 25 comprise relatively wide or long, substantially planar or flat surface or face portions 1 connected between relatively short or narrow, substantially planar or flat surface or face portions 2. Line edges 3 and 4 extend longitudinally of each portion 25d to form or define hammer or peen edges at peripherally-spaced locations about the periphery of the roller. As shown particularly in Figures 1 and 4A, each peening portion 25d has a somewhat cylindrical portion 5 which lies immediately adjacent the intermediate, banding portion 25c, and a somewhat cone-shaped portion 6 which extends and declines outwardly to the end of the roller.

Since each joint-forming roller 25 is somewhat loosely mounted for accommodation within the cage of the tool 15, it is apparent that it may, as shown in Figures 2 and 3, be advanced outwardly by the mandrel part 19 from the position of Figures 1 and 2 and the dotted line position A of Figure 3 to the full line position B. Assuming that, as shown in Figure 4, the rotation of each peening roller 25 is counter-clockwise, then the edge 3 will be the leading edge and 4 will be the trailing edge. These edges constitute hammering or peening edges which simultaneously expand and peen-out spaced-apart bands 10c on the inside of the tubing member or pipe section 10, while an intermediate portion 10a of the member 10 is being rolled into the groove 11a of the member 11.

Figure 4 illustrates the peening and overlapping effect of the flats of the end portions 25d of each roller 25. Instead of the force being spread over an area a on a single turn stroke, a number of strokes b are produced in a given area. It will be noted that the rollers 25 are mounted for relative rotative movement within the cage and are driven by rotation of the cage or tool body 16 within the assembly of members 10 and 11. Thus, each roller tends to assume a new position each time the tool 15 is rotated. It is apparent that the peening edges 3 and 4 do not strike in the same location every time but more or less overlap each other to, in effect, expand the tubing 10 evenly throughout its periphery or circumferential extent, see also Figure 5 of the drawings.

Referring particularly to Figures 1, 2 and 3, I have illustrated a suitable tool apparatus 15 for rolling grooves in relatively small diameter pipe members, such as of about 2 inches inner diameter. The housing body 11 has, in addition to the connection groove 11a, an outwardly-projecting shoulder portion 11c with which guide means, such as rollers 20 are adapted to cooperate. It will be noted that rollers 20 cooperate with rollers 22 to maintain rollers 25 in a suitable longitudinally-aligned operating relationship. If the member 11 is of uniform diameter, the rollers 20 may be employed to cooperate with the edge of the end portion of the inner member 10 which is to be joined to the outer member 11.

Generally speaking, the tool 15 has a cage for operatively and somewhat loosely carrying and positioning peripherally spaced-apart sets of expander rollers, each set of which comprises a guide roller 22 and a forming roller 25 that form a longitudinally or axially-aligned pair. Body part 16 carries the cage and suitable guide or gage rollers 20 that are rotatably mounted within circular depression portions 16b (see Figure 1) on headed stub shafts or pins 21 to project radially or at substantially right angles to the rollers 22 and 25. The wedge-shaped shaft or mandrel part or member 19 is operatively positioned to extend through a central bore 16a to expand the assembly of rollers 22 and 25 radially-outwardly within their cage mounting.

A head cap or member 17 is secured to the outer end of the body member 16 by cap screws 18 and is internally threaded at 17a to operatively receive a threaded portion 19a of the wedge shaft or mandrel part 19. The mandrel part 19 has a wrench flat outer end portion 19b which may be connected in a conventional manner to a manual power means or preferably, to a motor means for rotating it. A pin may extend through the pin hole 19c to secure it in a driving relationship to a motor shaft, see for example Figure 4 of the Wallace application No. 465,334 which is now Patent No. 2,835,309, filed October 11, 1954.

The bore 16a of the body or housing member 16 extends endwise therethrough to by-pass the tapered end portion 19d of the mandrel 19. By way of example, the taper of the portion 19d may be about ½ of an inch per foot of length or about .0417 per inch of length.

To guide the tool 15 during its rotation and to gage the inner position to which it is introduced within the tubing assembly, I have provided the series of radially-positioned, side guide rollers 20. The pins or shafts 21 are secured in position by threaded ends of set screws 27. The set screws 27 are mounted to extend longitudinally of the body 16 in substantial axial alignment with the roller pairs 22 and 25 and each has an indented bearing recess 27a in its head portion to receive an outer end of a pin shaft 26. The guide rollers 20, by abutment with the shoulder portion 11c, may also be employed to gage the alignment of the forwardly-located roller sets or pairs with respect to the groove 11a which, in accordance with my procedure, is preliminarily provided in the outer or thicker wall member 11.

The joint-forming rollers 25 have been previously described in some detail as to their surface portions. As shown particularly in Figures 2 and 3, they are positioned between corner segments or longitudinally-extending bars or portions 16c of the cage provided by the housing body 16. At their forward ends, they have a bearing bore 25a to receive a stud or pin shaft 22a of the cooperating and forwardly-mounted and associated expander roller 22 whose pin shaft may have a drive-fit within its bore. The pin or stud shaft 22a projects forwardly to rotatably position the roller 22 within a bearing groove 23a of a front head part or piece 23 of the cage assembly. As shown in Figure 1, the part 23 is removably secured in position by cap screws 24 which engage within threaded bores of the corner bar portions 16c of the housing body 16. At their inner ends, each joint-forming roll 25 has a bore 25b within which short length pin or stud shaft 26 has a drive-fit to project therefrom into the bearing groove 27a of one of the set screws 27.

To operate the tool of Figure 1, the threaded portion 19a of the mandrel 19 is advanced within the positioning part or head member 17 until its tapered portion 19d moves into contact with the intermediate cylindrical, annular or banding portion 25c of the rollers 25. When friction between rollers 25 and the portion 19d is sufficient, the entire tool 15 then begins to rotate and, as the portion 10a is formed, the mandrel 19 substantially simultaneously continues its advance to increase the wedging-out action upon the rollers 25. The maximum extent of the advance of the mandrel 19 is limited to the forming of a tongue and groove connection or joint and thus, to the depth of the groove 11a, see Figure 5 of the drawings.

During rotation of the entire tool 15, the rollers 25 simultaneously peen and expand-out the wall of the inner tubular member or section 10 upon and into cooperating portions of the inner wall of the outer tubular member 11. To remove the tool 15, rotation is reversed which causes the mandrel shaft 19 to loosen its wedging action and at which time the entire tool can be withdrawn. During the rotation of the tool as a whole, the rear guide rollers 20 aid such action in combination with the forward rollers 22.

The rollers 22, which are of barrel or somewhat cylindrical shape, are slightly tapered or rounded at their ends and each cooperates with a joint-forming roller 25 to constitute an expander roller pair. The pins 22a and 26 are of relatively smaller size or diameter than their positioning bearing grooves, such as 23a, 25a and 27a, so that (as shown in Figure 3) the longitudinal roller pairs can move from the inner, dot and dash line position A of Figure 3 to the outer expanded, solid line position B.

By employing the principles of my invention, that is, by employing my method of forming a joint, and as carried out by means of a hammering or peening type of expander roller means, an expander tool employing such roller means may be conveniently used either in the factory or in the field to join an assembly or a pair of hollow members. Since joint-sealing and assuring mastic is no longer necessary, field operations are facilitated.

The ultimate user may now take a coupling housing body or nose part and secure it in position to any locally-available pipe or tubing member of the desired length, and do so quickly and effectively and permanently and without any special welding equipment or problems incident to welding of unlike or even similar metals together. The joint produced is neat and one such joint has been found sufficient to secure and maintain end portions of tubing members together in a cooperating and telescopic relationship and to withstand pressures of up to about 900 pounds per square inch without separation or fluid leakage. The outer or thicker body part 11 constitutes the backing member and is provided with the groove to receive the edge-peened, offset band, wall portion 10a or annular tongue that is expanded into it from the inner or thinner wall member 10.

What I claim is:

1. A roller expander device for securing a relatively thin wall tubing member to a relatively thicker wall member having an annular groove therein which comprises, joint-forming roller means, means mounting said roller means for advancing it radially-outwardly into expanding engagement with an inner peripheral portion of the thin wall member in alignment with the annular groove of the thicker wall member; said roller means having a centrally-positioned annular banding portion of a width substantially corresponding to the width of the annular groove in the thicker wall member, and having a pair of end portions projecting longitudinally from and of lesser outer diameter than said banding portion; each of said end portions having peening edges connected by surface portions of lesser diameter than said peening edges, and means for moving said roller means radially-outwardly while rotating it about the inside of the thin wall member to expand a wall portion of the thin wall member into the groove of the thicker wall member with said banding portion and to simultaneously peen and expand adjacent wall portions of the thin wall member with the peening edges of said end portions.

2. A roller device for deforming and securing a relatively thin wall member to a relatively thicker wall member having an annular groove therein which comprises, joint-forming roller means, means mounting said roller means for advancing it radially into deforming engagement with a peripheral portion of the thin wall member in alignment with the annular groove of the thicker wall member; said roller means having an annular band portion of a width substantially corresponding to the width of the annular groove in the thicker wall member, and having at least one end portion projecting longitudinally from one side of and of lesser diameter than said banding portion; said end portion having peening edges about its periphery that are connected by surface portions of lesser diameter than said peening edges, and means for moving said roller means radially while rotating it about a periphery of the thin wall member to deform a wall portion of the thin wall member into the groove of the thicker wall member with said banding portion and to simultaneously peen and deform an adjacent wall portion of the thin wall member with the peening edges of said end portion.

3. A roller expander device as defined in claim 2 wherein, said roller means has an opposite end portion projecting longitudinally from an opposite side of and being of lesser diameter than said banding portion, and said opposite end portion also has peening edges about its periphery that are connected by surface portions of lesser diameter than said peening edges.

4. A joint-forming roller construction for use in an expander tool which comprises, a longitudinal roller body, an annular roller banding portion projecting radially-outwardly from a central length portion of said roller body to roll-out-expand an annular joint band in a wall of a tubing member, peening end portions connected to and extending longitudinally from immediate opposite sides of said roller banding portion, said peening end portions being of lesser diameter than said roller banding portion, said peening end portions having peripherally spaced-apart peening edges connected by surface portions of lesser diameter than said peening edges, and said peening end portions cooperating with said roller banding portion to simultaneously edge-peen wall portions in the tubing member along opposite sides of the annular joint band.

5. A device for rolling a joint band from the wall of a tubing member into an annular groove of a circumscribing member while simultaneously peening-expanding the wall of the tubing immediately adjacent and along a side of the joint band to provide a secure connection with the circumscribing member which comprises, a roller body member, a rolling banding portion on said body to roll a joint band from the wall of the tubing member into the annular groove of the circumscribing member, a longitudinally-extending peening portion immediately adjacent and connected to said roller banding portion to peen the wall of the tubing member immediately adjacent and along the joint band into a secure connection with the circumscribing member, said peening portion being of lesser diameter than said roller banding portion, said peening portion having peening edges connected by surface portions of lesser diameter than said peening edges, and means for actuating said roller body and moving it radially-outwardly in an operating relationship with the wall of the tubing member.

6. A device for rolling a joint band from the wall of a tubing member into an annular groove of a circumscribing member while simultaneously peening-expanding the wall of the tubing member immediately adjacent to and along opposite sides of the joint band to provide a secure connection with the circumscribing member which comprises, a roller body, a roller banding portion on said roller body to roll a joint band from the wall of the tubing member into the annular groove of the circumscribing member, longitudinally-extending peening portions immediately adjacent and connected to opposite sides of said roller banding portion to peen the wall of the tubing member immediately adjacent and along the joint band into a secure connection with the circumscribing member, said roller banding portion being of larger diameter than said peening portions, said peening portions having peening edges connected by surface portions of lesser diameter than said peening edges, and means to actuate said roller body and move it radially in an operating relation about the wall of the tubing member.

References Cited in the file of this patent

UNITED STATES PATENTS

| 1,444,395 | Seigle | Feb. 6, 1923 |
| 1,881,867 | Nelson | Oct. 11, 1932 |
| 1,930,825 | Raymond | Oct. 17, 1933 |
| 1,938,194 | Rader | Dec. 5, 1933 |
| 1,998,047 | Farr | Apr. 16, 1935 |
| 2,266,796 | Parker | Dec. 23, 1941 |
| 2,499,630 | Clark | Mar. 7, 1950 |
| 2,690,783 | Colmerauer | Oct. 5, 1954 |

FOREIGN PATENTS

| 6,242 | Great Britain | Apr. 11, 1891 |
| 560,205 | Great Britain | Mar. 24, 1944 |